United States Patent [19]

Adney et al.

[11] Patent Number: 4,962,666
[45] Date of Patent: Oct. 16, 1990

[54] MASS FLOWMETER APPARATUS

[75] Inventors: Billy R. Adney, Orange, Tex.; Charles W. Alworth, Ponca City, Okla.; John B. Durkee, Ponca City, Okla.; Bryce T. Jeffries, Ponca City, Okla.

[73] Assignee: Conoco Inc., Ponca City, Okla.

[21] Appl. No.: 295,862

[22] Filed: Jan. 11, 1989

[51] Int. Cl.⁵ .................... G01F 3/38; G01F 25/00
[52] U.S. Cl. ................................. 73/223; 73/3
[58] Field of Search ............ 73/3, 200, 219, 220, 73/223

[56] References Cited

U.S. PATENT DOCUMENTS

| 2,991,645 | 7/1961 | Lauderdale ...................... 73/3 |
| 3,001,397 | 9/1961 | Leonard . |
| 3,376,883 | 4/1968 | Douty et al. . |
| 3,418,081 | 12/1968 | Graver et al. . |
| 3,474,815 | 10/1969 | Beahm et al. . |
| 3,503,411 | 3/1970 | Bauer et al. . |
| 4,262,686 | 4/1981 | Heim et al. . |
| 4,397,189 | 8/1983 | Johnson et al. . |
| 4,535,482 | 10/1985 | Tomlinson et al. . |
| 4,718,443 | 1/1988 | Adney et al. . |

FOREIGN PATENT DOCUMENTS

457014 2/1975 U.S.S.R. .

*Primary Examiner*—Charles A. Ruehl
*Attorney, Agent, or Firm*—Cortlan R. Schupbach

[57] ABSTRACT

This invention relates to a method and apparatus for a liquid mass non-venting flowmeter. The flowmeter apparatus gives correct flow regardless of changes in density, viscosity, or composition of the liquid and corrects flow in spite of errors common in currently used flowmeters, such as calibration shifts, restricted orifices and/or bearing drag and blade wear of turbine meters. The non-venting characteristic allows use with toxic and corrosive materials.

4 Claims, 6 Drawing Sheets

FIG. 1

FIG. 2
PROTOTYPE APARATUS $L_2$ = LENGTHS GIVEN IN ANALYSIS SECTION

ALL DIMENSIONS IN INCHES, REFERENCED TO THE ₵ OF LOWER PIPE

ID2 = 2.067 INCHES

ID<2 = 2.000 INCHES

ID ⅜ TUBING ≈ 0.3050 INCHES

FIG. 3

PHYSICAL DIAGRAM

LUMPED PARAMETER MODEL

MASS FLOWMETER APPARATUS

This invention relates to measuring mass liquid flow rates. More specifically, this invention relates to measuring mass liquid flow rates utilizing an apparatus in open direct communication with the flow line being measured, wherein all liquid flow passing through the flow line can pass through the mass flowmeter apparatus. The apparatus does not vent while providing excellent accuracy, allowing use of the apparatus for liquids which are toxic or corrosive or have low vapor pressures.

BACKGROUND OF THE INVENTION

Accurate measurement of liquid flow in services such as oil field production, pipelines, injection of catalysts, catalyst inhibitors, co-catalysts, laminar flow, slurries (multi-phase liquid/solid suspensions), "pure" liquids, solutions, liquid/gas suspensions, pulsating systems and the like has long been a problem. Flowmeters in the past have largely depended upon knowing the density, viscosity, and composition of the liquids, and assumes that steady state flow conditions are being measured. Various flowmeters have always been subject to errors such as calibration shifts, orifice restrictions, bearing drag and blade wear of turbine meters when inserted into liquid flow for measurement. The problem is particularly acute with respect to flow of high viscosity liquids, or flow which contains contamination or quantities of solids, or flows in the transition or laminar regions, or flow streams which are in essence slurries. Liquids of this type are typically metered by an integral orifice meter at lower flow rates. Such meters are subject to partial plugging by the metered liquid and the solids contained therein, which partial plugging results in an "unknown flow" such that, one flow is reported, while a second unknown flow actually flows. This "unknown flow" is often discovered only by product deterioration or by lost product at varying times after the metered flow no longer accurately reports the actual flow. Often, such partial plugging spontaneously clears. However, as such clearing often occurs after steps are taken to correct or adjust the unknown flow, a period of end product variability results, resulting in large amounts of end product waste and a resultant unknown flow through the unplugged orifice.

In many processes, where possible, these problems are avoided by simply injecting an over supply of the required liquid. In other processes, an over supply results in a non-desired product and such a simple excess will not effectively overcome the lack of knowledge of liquid flow. In such situations, it has been common to use two or more meters in series, but it is difficult to reconcile differing readings and to be sure which, if either, reading is correct. Other situations, such as intercompany or interplant transfer of liquids through pipelines, often result in inaccurate charges and oversupply or supply deficiencies in the fluid transferred.

The "unknown flow" costs industry considerable sums of money in off-specification product, liquid oversupply and undersupply, or other forms of waste. It would be highly desirable to provide an apparatus and method for determining mass flow accurately, reproducibly and preferably in a self-checking, self-correcting flowmeter which can adjust flow to a present target level, and correct its own output signal to give the true flow.

Representative but non-exhaustive examples of prior art attempts to measure and control flow is represented by U.S. Pat. No. 3,001,397 which utilizes a two-reservoir system having a valve between reservoirs which measures the change in reservoir level when the valve is closed for a pre-determined time. U.S. Pat. No. 4,353,482 is an example of conventional wet and dry blend feeding and metering systems. U.S. Pat. No. 4,397,189 describes a method for measuring low levels of liquid flow rates but does not provide continuous flow measurement, does not measure mass, and diverts fluid flow for measurement readings rather than processing all fluids.

Some flowmeters utilize a Coriolis effect, where the liquid flows through at least one tube and deflects the tube, where the degree of deflection over time is used to derive a mass flow reading. Such meters are subject to errors introduced by manufacturing, materials of construction, calibration, abrasive wear on the tube, and product coating.

Coriolis meters are normally made of stainless steel, but in some applications other materials must be used, such as tantatium, titanium, or the like, thus limiting accuracy. The apparatus of the present invention can be made from liquid-containing material of choice without loss of accuracy.

This invention is an improvement over our mass flowmeter apparatus described in U.S. Pat. No. 4,718,443. Our previous invention was made in response to a continuing need for accurate measurement of mass flow without knowing the density, composition or viscosity of the liquids measured. The invention described admirably filled those needs, but had one significant disadvantage: the requirement that the calibration tank vent while filling. Changes in column pressure were believed to adversely affect the instrument error.

It would be of great benefit to provide an apparatus capable of accurately measuring mass flow without the necessity of venting the calibration tank on the fill cycle.

It would be of great benefit to provide an apparatus and method for accurate measurement of flow as well as a means to correct the flow in the event of partial plugging of the meter, or a change in inherent meter performance, or a change in operating conditions, which in turn changes the fluid properties being measured.

It is an object of the present invention to provide an apparatus and a method for measuring liquid mass flow without venting the calibration tank on the fill cycle. Other objects will become apparent to those skilled in the art as the description proceeds.

SUMMARY OF THE INVENTION

We have discovered that mass flow can be accurately measured by a non-venting apparatus comprising (1) a substantially vertical container having a known mass content per unit of height or weight as measured by pressure read at different liquid levels, such that the difference in pressure between any two liquid levels equates to a difference in mass, and wherein the container is in direct open fluid communication with a conduit containing liquid; (2) means capable of providing and maintaining a set minimum positive displacement pressure in said vertical container; (3) means for filling said vertical container with liquid against said set minimum pressure; and (4) means for monitoring the amount of liquid in the vertical container as change in mass over a measured time interval or a change in mass over a change in mass as determined by a given span of the reference container. Either method can be used with equivalent results. In this specification and claims, the terms "calibration tank" and "reference container" are synonymous. The apparatus can run intermittently, but preferably always provides flow of liquid from the reference container to the downstream process or to the reference container from the upstream source. During the fill cycle, the metered liquid enters the reference container by a fill valve which is controlled by a fill means such as a level transmitter or load cells. The signal is monitored and fills the container whenever the column head is below a specified level, such as 10 or 20 percent, or when a prove cycle is finished. The container is then filled to an upper value, such as approximately 70 to 90 percent, and the fill valve is closed. Time is allowed for container bounce to settle before the emptying cycle begins. During the emptying cycle, a positive fluid pressure, from the blanket gas above the measured liquid in the vertical container, forces the exiting liquid into the flow line. Measurements as to height of container head or weight of container head are made during fill and emptying cycles and the mass of the liquid exiting the container is measured by comparing to a predetermined mass per unit of height or weight in the container. Measurement continues until the container head again falls below the specified level, and the container is refilled. This process is repeated as necessary in order to maintain liquid in the container and preferably provide a constant reservoir for the downstream process. As in the prior invention, the apparatus uses fill and prove cycles. It was previously believed that the apparatus could not be used to fill against a varying pressure (which increases as the calibration tank fills). The present invention provides for such fill against pressure and does not require venting. The procedure described constantly updates the true mass flow rate. The present invention can be used to monitor flow either upstream or downstream of the reference container.

The present invention is insensitive to the density and viscosity of the liquid measured, while accurately providing a measurement of mass. If the density increases, the upper and lower set points will be lower in the container in an absolute sense, but will nonetheless measure the mass flow accurately. Conversely, liquid of less density will have set points higher in the container, but will reflect mass flow accurately. Even when several fill lines to the container are used, each with a liquid of different density, the mass flow of the exit line will be accurately measure. The viscosity (if less than 200 to 300 centipoise) will have no effect on the apparatus. Viscosity becomes a problem only with extremely viscous liquids. The error caused by not venting the pressure during calibration tank filling is a function of pressure change, temperature, and vessel geometry. We have found that these errors can be minimized to the point of inconsequence by controlling the temperature and geometry, and minimizing the pressure change as hereinafter described.

As with the previous apparatus, the apparatus of the present invention can check its own performance (or the performance of any flowmeter) by comparing the current meter readings against the integrated totalized meter readings of past cycles to obtain a correction factor, and then control the flow of the liquid line by adjusting the flow utilizing the correction factor. Carrying out such a checking function, the apparatus comprises a self-checking mass flowmeter apparatus comprising: (1) a substantially vertical container having a known mass content per unit of height or weight, said container in direct open fluid communication with a conduit containing liquid; (2) means capable of providing and maintaining a set minimum positive displacement pressure in said vertical container which means can be a blanket fluid or gas; (3) means for filling said vertical container with liquid, against said minimum positive displacement pressure in said container; (4) means for monitoring the mass of liquid in said vertical container over a measured time interval and determining rate of flow as change in mass divided by elapsed time as liquid exits the container; (5) means for determining the ratio $$\frac{\text{mass exiting container}}{\text{integrated output of previous flowmeter readings}}$$

to obtain a correction factor; and (6) means for adjusting the flow rate of liquid in said flow line to a target flow rate based upon the correction factor.

The apparatus of the present invention can check the performance of a flowmeter of any type, either itself or a flowmeter external to the apparatus, by determining a correction factor in the manner described and controlling liquid flow through the flowmeter as required (target flow rate).

In one embodiment, the instantaneous rate of change of pressure head is equal to the flow rate as described below. Thus, the apparatus of the present invention can function as a stand-alone flowmeter (without a conventional flowmeter in the monitored flow line.) In a single container apparatus, the last measured flow rate is "held" by the processor during the time the calibrated container fills or empties and "bounce" settles. As soon as the instantaneous change of pressure head measurement is available, the processor uses the updated value as flow (if necessary producing a new correction factor) and the new value is "held" by the processor during the fill cycle, and so forth.

In practicing this invention, the substantially vertical container can be of any shape or size desired. However, when filling against pressure, the calculations would become very complicated, and will require additional computing capacity in the micro-controllers; thus it is preferred to use a cylinder for ease of calculation and cleaning. The container is then calibrated for mass content per unit of height (such as by change in pressure head) or weight using a known reference liquid such as water. Once the container has been calibrated, similar changes in height or weight will determine the amount of mass exiting the container, which when divided by elapsed time, gives the current flow reading. An example of the calibration for directly measuring flow is to measure the change in the differential pressure between the highest and lowest set points of the container. The difference between the two readings is equal to the change in force divided by the area. Since force is equal to mass times the gravity constant, the difference in differential pressure is the net difference in the mass flowing into or out of the column. Alternately, the calibration can be made by measuring the pressure at the bottom of the container where the pressure measured is equal to the force times the area of the container. The force is equal to the mass times the gravity constant, therefore the change in mass times the gravity constant times the area equals the difference in pressure. Using this relationship, a change in container head directly relates to a change in mass. Stated in equation form for the venting apparatus:

$$\text{Pressure} = \frac{\text{Force}}{\text{Area}} = \frac{\text{gravity constant} \times \text{Mass}}{\text{Area}}$$

$$= \frac{\text{gravity constant}}{\text{Area}} \times \text{Mass}$$

so $$\Delta \text{Pressure} = \frac{\text{gravity constant}}{\text{Area}} \times \Delta \text{Mass}$$

where mass is a function of the liquid and gas mass, the gas being that which replaced the liquid. Expressed in equation form, $$\Delta \text{Mass} = \Delta \text{Mass of liquid} - \Delta \text{Mass of blanket fluid}$$

(gas or liquid) for the venting apparatus

The present non-venting invention is best understood with reference to FIG. 3, and the description below, which deals with the underlying theoretical basis for the actual operating model constructed and tested. The calibration tank, region 1, is divided into zones (Zone 0 through 5) as set forth in FIG. 3. Region 1 serves to model the effects of the fluid (liquid or gas) in the "high pressure" leg of the differential pressure transmitter. Each zone has a length associated with that zone ($l_{10}$ through $l_{15}$) and an Area ($A_{12}$ through $A_{15}$). Zone $A_{12}$ and $A_{10}$, having $l_{11}$ and $l_{10}$, will always be gas, but the gas density will vary as the liquid amount varies due to compression of the gas. Zone $A_{12}$ will contain first liquid and gradually gas, and a return to liquid as the tank refills over length $l_{12}$. Zone $A_{13}$, $A_{14}$ and $A_{15}$ will always contain liquid.

In the mathematical expression of the operating principals of the present invention which follows, $$\hat{g} = \frac{\text{acceleration due to gravity}}{\text{reference gravitational constant}}$$

$S$ = start $E$ = end

Figure 3:
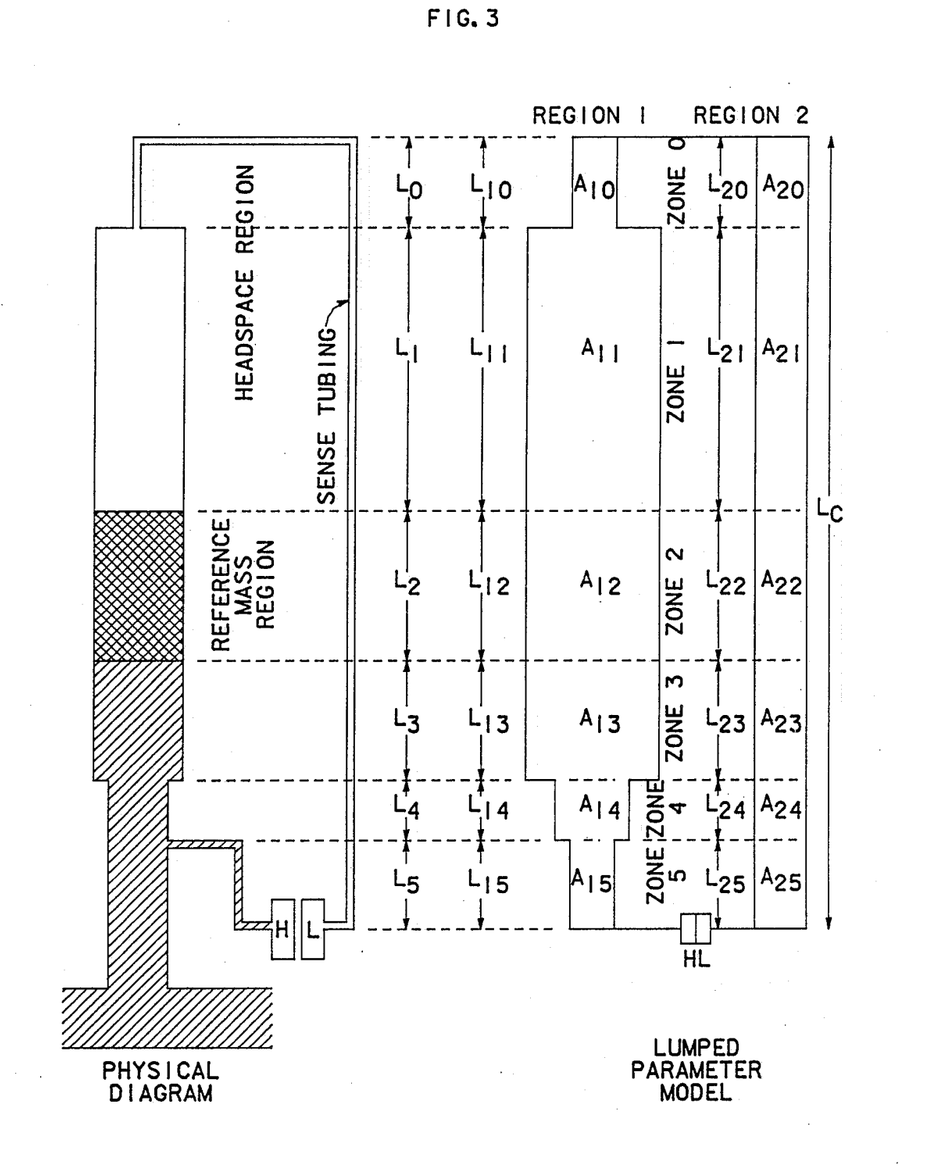
FIG. 3 is a schematic of the non-venting mass flowmeter apparatus showing an exaggerated pressure leg in order to describe the principles believed to govern operation and accuracy of the apparatus.

In FIG. 3, region 2 is a pressure leg column, the total zones (and length) of which is expressed as $l_C$. This region serves to model the effects of varying gas density in the "low pressure" leg of the differential pressure transmitter.

$$\Delta P_{Start} = \hat{g} \left[ \frac{M^S_{10g}}{A_{10}} + \frac{M^S_{11g}}{A_{11}} + \frac{M^S_{12l}}{A_{12}} + \frac{M^S_{13l}}{A_{13}} + \frac{M^S_{14l}}{A_{14}} + \frac{M^S_{15l}}{A_{15}} \right] -$$

$$\frac{\hat{g}}{A_2} [M^S_{20g} + M^S_{21g} + M^S_{23g} + M^S_{24g} + M^S_{25g}]$$

$$\Delta P_{End} = \hat{g} \left[ \frac{M^E_{10g}}{A_{10}} + \frac{M^E_{11g}}{A_{11}} + \frac{M^E_{12g}}{A_{12}} + \frac{M^E_{13l}}{A_{13}} + \frac{M^E_{14l}}{A_{14}} + \frac{M^E_{15l}}{A_{15}} \right] -$$

$$\frac{\hat{g}}{A_2} [M^E_{20g} + M^E_{21g} + M^E_{23g} + M^E_{24g} + M^E_{25g}]$$

The gas in the column can be summed, and by collecting terms $$\Delta \Delta P = \Delta P_S - \Delta P_E$$

-continued $$\Delta \Delta P = \hat{g} \left[ \frac{M^S_{10g}}{A_{10}} + \frac{M^S_{11g}}{A_{11}} + \frac{M^S_{12l}}{A_{12}} + \frac{M^S_{13l}}{A_{13}} + \frac{M^S_{14l}}{A_{14}} + \frac{M^S_{15l}}{A_{15}} \right] -$$

$$\left[ \frac{M^E_{10g}}{A_{10}} + \frac{M^E_{11g}}{A_{11}} + \frac{M^E_{12g}}{A_{12}} + \frac{M^E_{13l}}{A_{13}} + \frac{M^E_{14l}}{A_{14}} + \frac{M^E_{15l}}{A_{15}} \right] -$$

$$\frac{\hat{g}}{A_2} [M^S_{2g}] + \frac{\hat{g}}{A_2} [M^E_{2g}]$$

Since liquid is incompressible, $M^S \equiv M^E$
So, $$\Delta \Delta P = \hat{g} \left[ \frac{M^S_{10g}}{A_{10}} - \frac{M^E_{10g}}{A_{10}} + \frac{M^S_{11g}}{A_{11}} - \frac{M^E_{11g}}{A_{11}} + \frac{M^S_{12l}}{A_{12}} + \frac{M^E_{12g}}{A_{12}} \right] -$$

$$\frac{\hat{g}}{A_2} [M^S_{2g} - M^E_{2g}]$$

The mass of the gas is given by:

$$M_g = \rho_g V_g$$

where $\rho_g$ = density of the gas
$V_g$ = volume of the gas
    = $\rho_g L_g A_g$ where
$L_g$ = height of the column
$A_g$ = area of the column If $\rho_g^S$ and $\rho_g^E$ indicates starting and ending $\rho_g$, and assuming temperature as a constant, then $\rho_g$ is given by:

$$\rho_g = \frac{\overline{M}P}{ZRT}$$

as found in the literature, where
$\overline{M}$ = Gas Molecular Weight
Z is the gas compressibility factor (Z=1.0).
Mass change is indicated by $$\frac{M^S}{A} - \frac{M^E}{A} = > \frac{\rho^S V}{A} - \frac{\rho^E V}{A}$$

$$= \frac{\rho^S A l}{A} - \frac{\rho^E A l}{A}$$

$$= \rho^S l - \rho^E l$$

or in terms of starting and ending pressure $$= \frac{\overline{M} P^S l}{ZRT} - \frac{\overline{M} P^E l}{ZRT}$$

$$= \frac{\overline{M} l}{ZRT} (P^S - P^E) = K(P^S - P^E)l$$

where $$K \stackrel{\Delta}{=} \frac{\overline{M}}{ZRT} \text{ for ease of explanation}$$

Substituting for the regions of the two columns $$\Delta\Delta P = \hat{g}\left[K(P^S - P_E)l_{10} + K(P^S - P^E)l_{11} + \frac{M^S_{12l}}{A_{12}} - \frac{M^E_{12g}}{A_{12}}\right] - \hat{g}[K(P^S - P^E)l_C]$$

Collecting terms $$\Delta\Delta P = \left\{\frac{\hat{g}}{A_{12}}[M^S_{12l} - M^S_{12g}]\right\} + \hat{g}K(P^S - P^E)(l_{10} + l_{11} - l_C)$$

Since $$l_{10} = l_0, \quad l_{11} = l_1$$

and $l_C = l_0 + l_1 + l_2 + l_3 + l_4 + l_5$, the total gas column length then $$\Delta\Delta P = \frac{\hat{g}}{A_1}[M^S_{12l} - M^E_{12g}] - \hat{g}K(P^S - P^E)(l_2 + l_3 + l_4 + l_5)$$

$$\Delta\Delta P = [\text{Venting Term}] - [\text{Non-venting Term}] = I$$

$M_{12g}{}^E$ can be described as $$\rho_g^E V_{12}/A_{12} = \rho_g^E l_2 = KP^E l_2$$

Substituting terms $$\therefore \Delta\Delta P = \frac{\hat{g}}{A_1}[M^S_{12l} - M^S_{12g}] - \hat{g}K(P^S - P^E)(l_3 + l_4 + l_5) = II$$

Equation I is more useful as it has the Venting Term given as starting liquid mass and ending gas mass. Since the ending pressure is fixed, I is especially useful.

In the venting mode described in our previous invention $$P^S = P^E$$

and $$M_{12g}{}^S = M_{12g}{}^E$$

and both I and II forms become the Venting Term.

Equation I can be rewritten as $$DP = C[M_l - M_g] - NL\Delta P$$

where

DP is the difference between the starting and ending differential pressures.

$M_l$ is the mass of the liquid that was removed over the above-mentioned differential pressure.

$M_g$ is the mass of the gas which replaced the liquid (mass measured at the ending pressure).

C is the calibration constant of the mass flow meter system comprising the column, differential pressure cell and controller.

N is the non-venting error constant of the mass flow meter system.

L is the distance from the center of the differential pressure cell to the top of the "filled" liquid column.

$\Delta P$ is the pressure change experienced in the column when the above-mentioned liquid mass is replaced with gas.

$NL\Delta P$ will be a constant for the system when the pressure change, $\Delta P$; the temperature, T; and the distance, L, remain constant. This will normally be true, although slight changes may occur. Then letting $W = NL\Delta P$, which is being kept as a separate term since W can be made to approach zero.

$$DP = C[M_l - M_g] - W$$

or $$C = \frac{DP + W}{M_l - M_g} = \frac{DP + W}{M_l(1 - M_g/M_l)} = \frac{DP + W}{M_l(1 - \rho_g/\rho_l)}$$

$$C = \frac{DP + W}{M_l E}$$

where $$E = 1 - \rho_g/\rho_l$$

where $\rho_g$ = density of the blanket gas at the operating pressure, and $\rho_l$ = density of the liquid in the mass flow meter.

Thus, $$M_l = \frac{DP + W}{C*E}$$

It now remains to determine W, C, and E.

C is determined by setting W identically equal zero and computing E at the operating pressure. This is most easily done by equating the column pressure at its fixed operating pressure during its fill and refill cycles (by venting blanket gas to keep $P^S = P^E$) and weighing the liquid coming from the column.

In our previous invention which vented the blanket gas on the fill side to maintain a constant pressure W=O. It was believed that any change in pressure would adversely affect the accuracy of the mass flowmeter. It was greatly desired to avoid venting unwanted gases which could be toxic or noxious. In developing a non-venting apparatus, it was discovered that the original venting apparatus had a small pressure differential, which was generally ignored, but which did produce an error which was so small that it was not detected.

In the present apparatus, this change of pressure is accounted for, and the error is limited to the accuracy of the transmitters and microprocessors used.

Thus, a simple head measurement can provide an accurate reading of mass remaining in the container at any given time even if the blanket fluid pressure varies. This measurement is independent of the density or viscosity of the liquid in the container.

It will be apparent to those skilled in this art that other methods for determining the mass of liquid in the container exist. For example, the container can be suspended from or positioned on strain cells and calibration can be carried out based on weight. The change in gas density has no effect here that is W=O. Whatever the method used, the present invention accurately measures mass liquid flow.

The substantially vertical container of the present invention can be of any geometric configuration, can be of any size, and can vary in size from top to bottom. The present invention operates from a calibration of such container with a liquid of known mass by stepwise draining liquid from the container and measuring the mass of the amount drained, and contained mass at various levels is determined. Practicality dictates that the container preferably be of substantially uniform cross-sectional area for ease of calibration, ease of calculations while in use, and ease of cleaning if necessary. Additional advantage is found in decreased expense for controllers, since less computing capacity is required. Of the possible containers, cylinders (or columns) are most preferred. For a container of substantially amorphous shape, or a container whose liquid surface area does not remain relatively constant, it is necessary to make numerous calibrations at close intervals in order to obtain accurate flow readings, leading to more difficult calculations, and potential loss of accuracy and repeatability.

Since the apparatus of the present invention determines flow rate accurately during the emptying cycle, use of the apparatus of the present invention to measure flow continuously requires multiple units to be utilized to generate a correction factor for the flow line as a whole. It is preferred to use the present invention to correct the flow of conventional matters. However, use of only a single apparatus will provide an intermittent direct flow measurement as well as a continuously updated correction factor to a standard flowmeter for example. Thus, the present invention can be used as a stand-alone flowmeter.

The present invention can be self-checking and self-correcting by determining the flow measured, comparing to a target flow, and generating a correction factor. The correction factor is obtained by dividing the mass exiting the container by the integrated output of previous meter readings. The meter readings can be obtained from the apparatus itself, other similar apparatus, or any flowmeter of conventional type. Even though such conventional flowmeters are subject to plugging, because of liquid passage through a restricted orifice; the apparatus of the present invention detects errors in such readings and directs a controller to provide sufficient flow to correct for such plugging problems. In the event of spontaneous clearing of the plug, the apparatus of the present invention senses the excess flow and reduces flow to meet the previously set target.

Since the present invention measures mass, the apparatus will give correct flow regardless of changes in density, viscosity, or composition of the liquid flowing through the line. Instrument errors common with currently used instruments, such as calibration shifts, partially plugged or restricted orifices, or bearing drag and blade wear in turbine meters, are overcome by constantly measuring the actual flow and correcting the actual flow based upon the correct or target flow. The differential pressure method of measuring mass per unit height inherently compensates for fluctuations in specific gravity.

PREFERRED EMBODIMENT

Although not limited to such, the present invention will be described in terms of the structure and operation of the presently preferred embodiment. The preferred embodiment is more completely understood with reference to the drawings.

The instant invention is more concretely described with reference to the examples below wherein all parts and percentages are by weight, unless otherwise specified. The drawings will be more concretely described with reference to the examples as the description proceeds. The examples are provided to illustrate the present invention and not to limit it.

While any substantially vertical container can be utilized in making the apparatus and carrying out the methods of the present invention, it is preferred that the apparatus use a container of substantially uniform cross-sectional area. Normally columns will be used as set forth in the preferred embodiment since these are more easily obtained and handled than other geometric configurations. For example, when column walls become fouled or encrusted, the mass readings do not accurately reflect flow, and it is much easier to "pig" or otherwise clean containers in the shape of a cylinder. The use of cylindrical columns, however, is a matter of convenience and ease of calculation and they are simply preferred rather than critical to the present invention.

For the venting mode, the differential pressure transmitter is spanned to approximately the same height in inches as the distance from the bottom of the transmitter to the top of the reference column. This span is called the reference column height and should never have to be changed. In the present invention mode, the transmitter is most often spanned to $l_1+l_2+l_3+l_4+l_5$. In the $l_1$ zone, the entire $l_1$ zone may not be used, as it can form a portion of the headspace, thus the span of the transmitter can be less than the above sum.

Often, about half of the volume of the column is used to calculate the mass of liquid to be used as a reference mass while the mass flowmeter is in service. For example, if the column is 80 inches high and its internal diameter is two inches, the volume of half of the column would be 125.7 cubic inches or 0.07272 cubic feet. The mass of liquid occupying this volume would then be used as the reference mass.

The integral Time is calculated using this reference mass and the maximum flow rate, SPH, as follows.

$$\text{Integral Time} = 2 \frac{\text{Reference Mass}}{\text{Maximum Flowrate}}$$

The reference mass is most easily adjusted by making the fourth significant figure in the integral time equal to zero. The factor of two is present because of scaling factors being used in the controller used (Moore Mycro TM Controller), and may vary depending on the type of controller used.

The setpoint deviation alarm is the percent change seen while the reference mass is flowing out of the column. This is calculated using the calibration constant of the mass flowmeter, the value of E, and the reference mass, as follows:

SDA=C*E*(reference Mass), where

C has unit of %/lb(m),

E is calculated using flowing conditions, and the reference mass has units of lb(m).

Thus, integral time, setpoint deviation alarm, and maximum flowrate have been calculated.

Since the differential pressure transmitter is spanned to approximately the same height as the reference column using water as a reference, the use of a liquid with a different specific gravity necessitates calculating the percent levels for that liquid.

EXAMPLE

Figure 1:
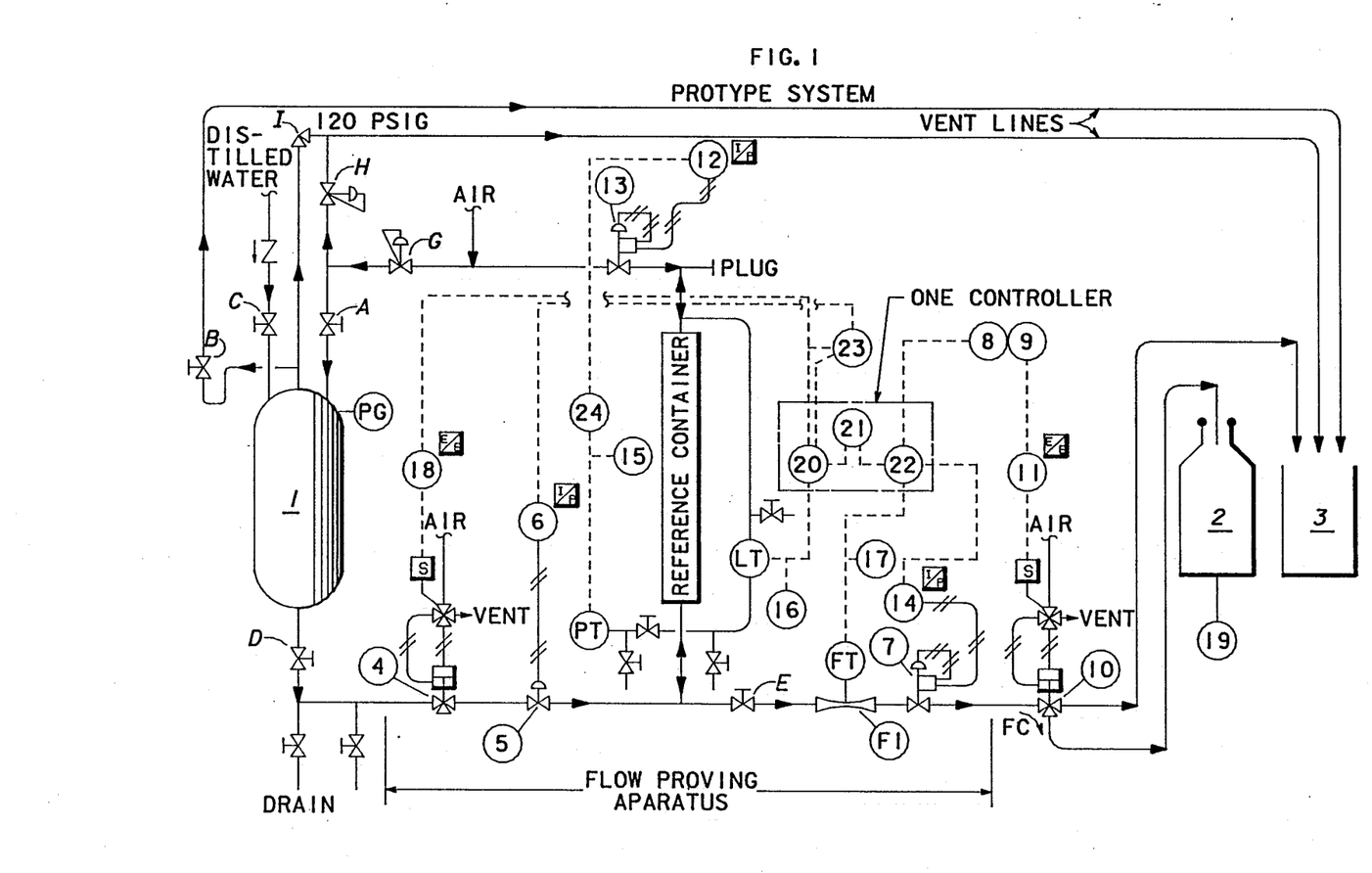
FIG. 1 is a schematic description of the present non-venting mass flowmeter apparatus that accurately measures mass flow.
Figure 2:
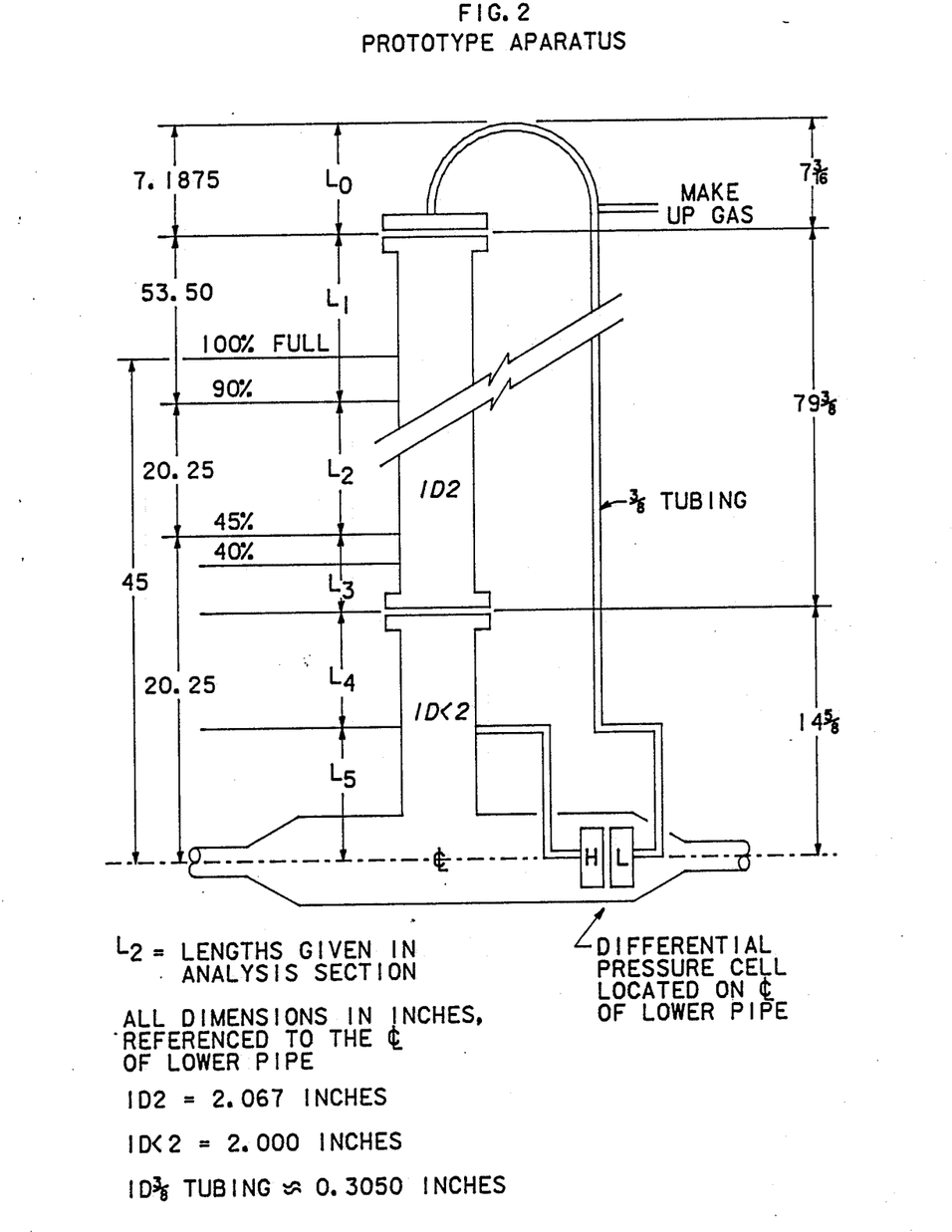
FIG. 2 is a schematic description of the non-venting mass flowmeter.

A prototype non-venting flowmeter system was constructed as described in FIG. 1 and calibration tank specifics are set forth in FIG. 2 where all dimensions are in inches. The system contains two fill valves in series, 4 and 5 (valve 5 is not a tight shut-off valve, but rather ramps open or closed gradually); the reference container (or calibration tank) which was internally coated with tetrafluoroethylene; a block valve, E; the capillary flowmeter and transmitter, FI and FT; and the flow control valve, 7; a fluid supply tank, 1; and associated blanket gas pressure control valves, A, G, and H; an electronic stopwatch and solenoid control valve circuit, 8 and 9, a dual port ball valve 10 and its control solenoid, 11; and two receiver vessels 2 and 3. This additional equipment was used to calibrate and test the operation of the apparatus on distilled water which was readily available.

In the prototype apparatus built, Star Line TM 1″ Series Ball Valves were used for 4 and block valves D and E because of their ease of repair and availability, although any suitable positive shut-off valves can be used. (For example, Whitney TM valves were used for A, B, and C.) The level transmitter designated LT is a Honeywell ST 3000 TM Electrical Differential Pressure Transmitter. The pressure transmitter designated PT is a Honeywell ST 3000 TM Electrical Pressure Transmitter. The three controllers designated 20/21/22, 23, and 24 are all Moore Mycro 352 TM, Revision 8 Electronic Controllers. The first controller, 21/22/23, all formed a single Moore Mycro 352 TM Controller which was programmed to fill the column when necessary, measure a set head change while integrating the flow signal (from Flowmeter FI and transmitter FT), calculate a correction factor and output the factor and calculate the correct flow, provide flow control output to the flow control valve (7) via the relay (14), which is a standard electronic to pneumatic converter module, provide the level signal to the second controller 23, and refill the column via the fill valves (4 and 5) for the next cycle. The comparison of column referenced flow and integrated flow (from FI/FT) is carried out by control block 21. Control of liquid flow is carried out by control block 22.

The refilling of the column involves two fill/control valves designated 4 and 5. 4 immediately opens whenever the first controller (20/21/22) calls for refilling the column; 5 is closed. 4 is controlled by an on/off signal from the first controller and control block 20 through the Electric/Electric relay 18 and the solenoid valve associated with 4. At the same time the second Moore Mycro TM Controller designated 23 starts to open the second level control valve 5, via 6. This controller is programmed to:

(a) Start with the current reference column level as its starting setpoint;

(b) Ramp the level setpoint to 100 percent of upper level at a predetermined rate;

(c) Based on the output of the level controller 23, slowly open and throttle 5 to maintain a steadily increasing level in the reference column;

(d) Return the second level control valve 5 to fully closed after the first level control valve is closed by the first controller 20/21/22.

The second level control valve 5 is necessary because the reference column pressure will start at a minimum and increase to a maximum. The upstream supply tank must be at a minimum of five pounds pressure above the maximum reference column pressure in order to be able to properly fill the reference column when required by the primary level controller 4. If the first level control valve 4, which is a tight shut-off valve, were to be opened immediately this high upstream pressure would be felt throughout the system and result in an upset in flow to the downstream process. The second valve essentially throttles the high pressure so that the pressure change in the reference column (and subsequently downstream) is not a step change. This allows a downstream controller to respond to variations in flow caused by a slow change in upstream pressure.

The function of 4 and 5 can be combined in a "Controlled Characteristic Ball Valve" such as the Fisher V-Ball TM or the Worcester CPT TM Ball Valve. In the prototype system, two valves in series were used for convenience.

Continuous positive pressure for displacement was provided by air (although inert gases such as nitrogen gas can of course be used) which is placed in the column headspace to provide a displacement pressure of 15 psig and/or 40 psig. Two pressures were used to determine whether any differences occur in accuracy. No differences were observed The pressure used should average about five pounds above line pressure. The pressure is provided through valve 13. In the non-venting application, no pressure relief is provided, and the pressure relief port necessary to the previous apparatus is plugged as labeled in FIG. 1). The minimum pressure is regulated by 24, which is a third Moore Mycro TM Controller programmed to read the column pressure provided by PT and maintain the minimum pressure at 15 or 40 psig (or at five pounds above line pressure) as required by operating conditions. This loop, which provides solution make up gas as necessary via pressure valve 13 and relay 12 for gas lost to solubility effects in the liquid measured, maintains the column headspace. In a plant environment, this pressure control loop can be replaced by a standard pressure regulator such as the Fisher 67FR TM.

The prototype system was used to check a capillary flowmeter designated FI. The capillary flowmeter is well known in the literature and provides a linear differential pressure across the meter with flow. Two sizes were used (¼ and ⅛ inch) depending on the flow rate. The ⅛-inch size was used for low flows, less than 5 pounds per hour (pph). The capillary coils were not placed in a controlled temperature environment in order to be able to test the mass flow correcting means at its limits. This differential pressure was measured with a Honeywell ST 300 ™ Electronic Differential Pressure Transmitter FT, although any high quality commercially available Electronic Differential Pressure Transmitter can be used. The Electronic Differential Pressure Transmitter signal was sent to the first controller 20/21/22 as the "raw flow" signal. The control block 22 then regulated the flow via 7 and an output relay 14.

The supply tank 1; the electronic stopwatch 8 and 9; the two-way ball valve 10 and its solenoid 11; the two liter flask 2 and its associated electronic scale 19 and the 5 gallon plastic bucket 3 were used to test the operation of the apparatus. In addition, the performance of the system was monitored by three strip chart recorders 15, 16, and 17.

Referring to FIG. 1, the supply tank 1 was filled with distilled water from the building supply lines by closing the blanket air supply valve A, opening the air vent valve B, and opening the water supply valve C. The tank was assumed to be full whenever water discharged through the vent valve B and vent line to the bucket 3. At this time the vent valve and water supply valves were closed and the blanket air supply line was opened. The tank pressure was then set to approximately two pounds above the anticipated maximum column pressure, using regulator valves G and H. Block valves D and E were opened. Safety valve I limits the maximum supply tank pressure to 120 pounds per square inch gauge (psig). The instrumentation system was activated and flow through the system was started. The system was allowed to cycle at least once in order to be able to observe the maximum reference column pressure and thus be able to set the supply tank pressure.

No venting of the blanket gas is permitted at any time and the maximum fill point is approximately one-half of the reference container volume. The top one-half of the reference column is used as blanket headspace. As a result, the column pressure will start at a minimum (when empty or at the end of a cycle) and rise to a maximum just as the level controller is satisfied and closes the level (fill) valves 4 and 5. The well known relationship $$P_1V_1 = P_2V_2$$

can be used to calculate the probable maximum column pressure; however, the equation will be in error as some of the blanket gas will go into solution If this is allowed to continue, the column headspace will completely fill with water or there will be no blanket gas pressure to force water out of the column. This adsorption of the blanket gas will occur over time with any liquid. Thus makeup gas is supplied through control valve 13 and the associated control loop as previously described. The minimum pressure at which makeup gas is supplied is a matter of convenience. In the test apparatus building compressed air was used as the makeup gas.

The reference column was tested for linearity. In this case, the system was only tested on distilled water as the same results with different liquids were known from the previous work. The reference column was set to use forty-five (45) inches of water with the remaining height approximately thirty-five (35) inches to serve as an air receiver. This setting kept probable maximum expected pressure within a reasonable limit. This value is given by using:

$$P_1V_1 = P_2V_2$$

and substituting for V thus obtaining:

$$P_{max} = P_{min} (headspace + Dh)/headspace$$

where P is given in absolute pressure, and Dh is the change in level used by the measurement technique.

Calibration of the Non-Venting Mass Flowmeter

The calibration will be described in terms of the experimental system built and proved. The percentages and numbers will be made more understandable by reference to FIG. 2, detailing the calibration tank:

The starting level: 90%
The ending level: 45%
The difference in readings: 45%
Total mass of water withdrawn: 2.3381 $lb_m$
The ratio $DP/M_l = 45\%/2.3381\ lb_m = 19.2464\%/lb_m$ $$Pg = \frac{(14.7 + 15\ psia)(28.96)}{(1.0)(10.73)(532°R)} = 0.1507\ lb_m/cu\ ft$$

The density of water at 72° F. = 62.32 $lb_m$/cu ft
The value of E is 0.9976
Thus, the calibration constant becomes 19.2927%/$lb_m$
The W coefficient is determined
$\Delta P = 7.5$ psi
$L = 40.5$ inches
$T = 72°$ F. (532° R.)

$$W = NL\Delta P$$
$$= g/gc\ \frac{\overline{M}}{ZRT}\ L\Delta P$$
$$= 0.1284\ lb_f/ft^2$$
$$= 0.0009\ psi$$

The differential pressure transmitters used were calibrated and certified in inches of water, so therefore $$E = 0.0009*27.68$$
$$= 0.0249\ inches$$

which must be converted to % of calibration tank span $$E = 0.0249/45 = 0.0554\%$$

$$\therefore M = \frac{DP + 0.0554}{19.2927}$$

the error introduced by $W = 0.0029\ lb_{mass}$

This error can be reduced when operating by setting the actual differential span of the instrument to account for the term W.

In practicing this art, the value of W must be made a minimum or completely eliminated. Two approaches may be taken.

W can be made minimum by:
(1) Making $l_2 + l_3 + l_4 + l_5$ approach a minimum, or
(2) Making $\Delta P$ approach zero.

Very little control can be exercised over $l_2$ as this is set by the flow rate and cycle time of the instrument.

Good practice shows that $l_2$ must be between 25 inches of water and 50 inches of water. In terms of actual inches $$\text{inches of water} = \text{physical inches}/SG_l$$

where $SG_l$ = Specific Gravity of the liquid being measured

Calibration of the column was slightly different. In this case, the column had been in operation in the vent mode for several months and the Integral Time Constant was known. The decision was made to operate between 40% and 100%, with 100% being defined as 45 inches of water. The Honeywell Differential Transmitter was known to be accurate (0.1%) with pressure changes of 20 inches of water.

FIG. 2 shows the column level trip points and why they were chosen. The internal diameter of the column is 2 inches and the bottom section of the column contains fittings and flanges which make the cross-sectional area vary. This section of the column was conveniently avoided. Thus, the column parameters were set to:

SDA = 45% (45% of 45" = 20.25")
CT1 not used as this was a laboratory test (overfill alarm point)
CT2 = 90% (stop fill point)
Automatic fill point 40% (40% of 45" = 18")

However, since the column integral time was already known for 40% changes from U.S. Pat. No. 4,718,443 with a liquid column set to 90 inches, the constant was modified using the formula:

$$\begin{aligned} IT &= \text{Integral Time} \\ IT &= (\text{New Mass} * \text{Old-}IT)/\text{Old Mass} \\ &= (2.458\text{ lb} * 13.4\text{ min})/4.355\text{ lb} = 7.564\text{ minutes} \end{aligned}$$

Since it was known that the mass values used were slightly in error, the system was allowed to cycle for a complete day while performance data was taken. It was found that with IT = 7.564 minutes and at 15 pph, the calibrated flow was 13.3 pph. The following formula was then used:

$$\begin{aligned} IT &= (\text{Averaged pph})/(\text{Requested pph}) * (\text{Old } IT) \\ &= (13.3/15) * 7.57 = 6.712\text{ minutes} \\ &= 6.71 \text{ (since the Moore Mycro uses three figures)} \end{aligned}$$

This technique saves considerable time and includes the column error coefficient.

Performance data was obtained after the system had stabilized at a given flow rate which was set by the first controller 20/21/22. In this case the flow controller portion was set to the target flow setpoint. The system was allowed to cycle (usually three times) to obtain a k-factor for the flowmeter, FI. During the subsequent cycles, the electronic stopwatch was started. This action caused the two-way ball valve 10 to divert the liquid flow from the bucket (waste) to the flask. After both a reasonable time had passed and a reasonable amount of water had been Weighed in the flask, the electronic stopwatch was "stopped". The weight and time were recorded, the flask emptied, returned to the scale, the scale "tared" and the stopwatch reset, to await the next data point. As soon as the new k-factor was available, the above procedure was repeated.

It should be noted that the two-way ball valve, a Worcester ™ Series 1-AD466TSE with a Model 059 Actuator was chosen and installed so that at no time would liquid flow be upset, because this valve will open to one leg as it closes to the other leg. The time to shift positions from bucket to flask and from flask to bucket were the same. The hydraulic lengths of the diverter valve to bucket line and the diverter valve to flask line were made to be identical. These steps were taken so that no error would be introduced when taking a sample. Clearly, variations on this equipment can be made.

Data was taken with the minimum column pressure set at 15 psig and at flow rates of 15, 10, and 5 pph using a ¼-inch flowmeter tube. These experiments were repeated using a ⅛-inch flowmeter tube at 15, 10, 5, 3 and 1 pounds per hour. The low rates could not be measured with a ¼-inch tube. At the low rates, error is introduced into the measurement because of the flowmeter tube was not kept at a constant temperature. The smaller tube was deliberately used to determine the limits of the technique with this prototype. This data is shown in Tables 1 and 2.

TABLE 1

⅛ Inch Coil

| | | | | | |
|---|---|---|---|---|---|
| Requested Setpoint pph | 15.00 | 10.00 | 5.00 | 3.00 | 1.00 |
| Average Flow pph | 15.021 | 9.995 | 4.987 | 2.996 | 1.007 |
| Two Sigma Error % | 0.073 | 0.241 | 0.127 | 0.802 | 3.048 |
| Average Error % | 0.137 | −0.51 | −.266 | −.115 | 0.722 |
| Max Error | 0.189 | 0.091 | −.178 | 0.666 | 3.853 |
| Min Error | 0.095 | −.234 | −.374 | −.631 | −.976 |
| Number of Samples | 5 | 8 | 9 | 10 | 11 |

TABLE 2

¼ Inch Coil

| | | | |
|---|---|---|---|
| Requested Setpoint pph | 15.00 | 10.00 | 5.00 |
| Average Flow pph | 15.019 | 9.995 | 4.999 |
| Two Sigma Error % | 0.083 | 0.242 | 0.280 |
| Average Error % | 0.125 | −.050 | −.024 |
| Max Error | 0.180 | 0.100 | 0.151 |
| Min Error | 0.052 | −.213 | −.278 |
| Number of Samples | 8 | 8 | 9 |

Figure 4:
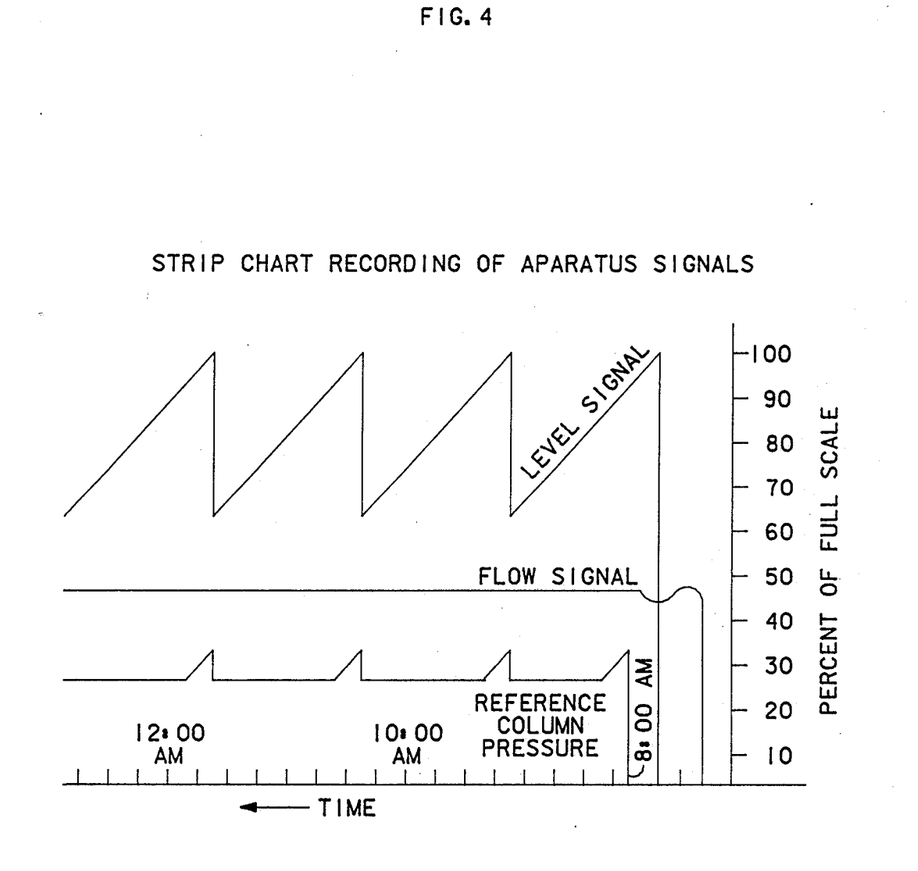
FIG. 4 is a chart showing the flow, level and pressure signals of the non-venting mass flowmeter.

Reproductions of the Flow, Level and Pressure signals are shown in FIG. 4. This figure shows the pressure increase during the fill cycle and the subsequent decrease due to Water leaving the column and air going into solution in the column. The data clearly shows the remarkable accuracy even though temperature variation in the capillary flow meter was allowed.

Figure 5:
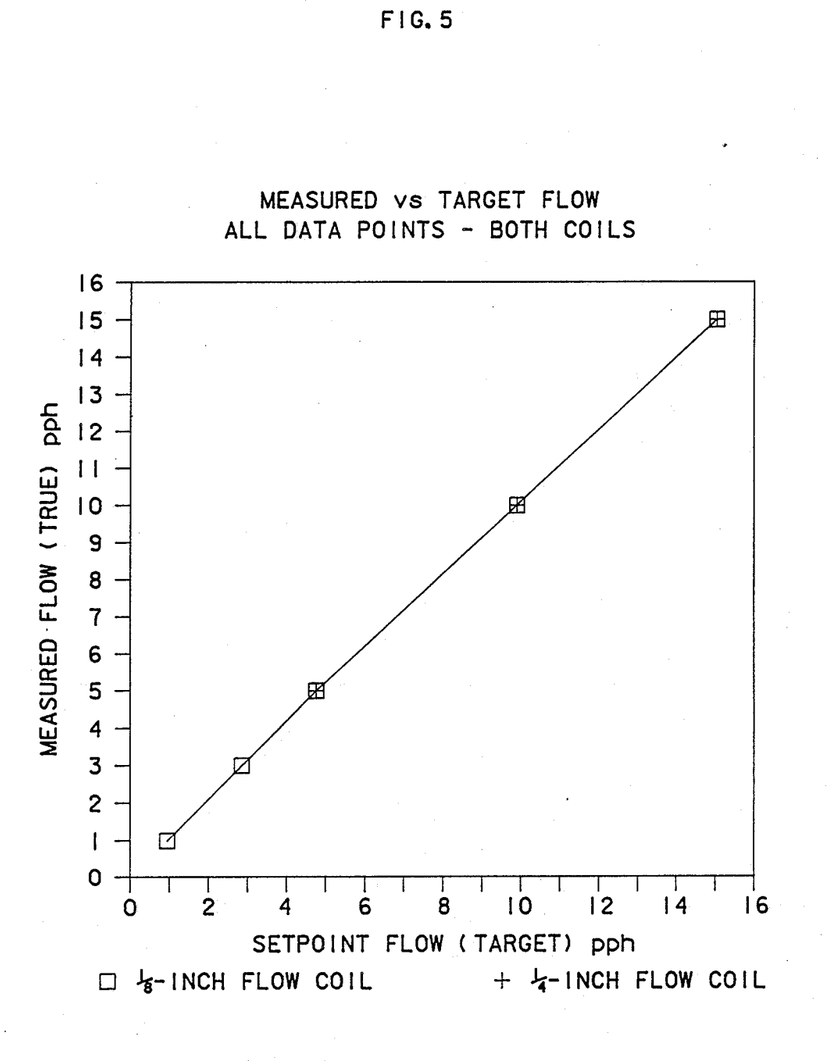
FIG. 5 is a graph combining data for different weighted flows against target flow setpoints.

FIG. 5 combines all the data for different weighed flows versus target flow setpoints. The error is so small that it cannot be seen in the figure, thus showing that the accuracy of the flowmeter is extraordinary.

Figure 6:
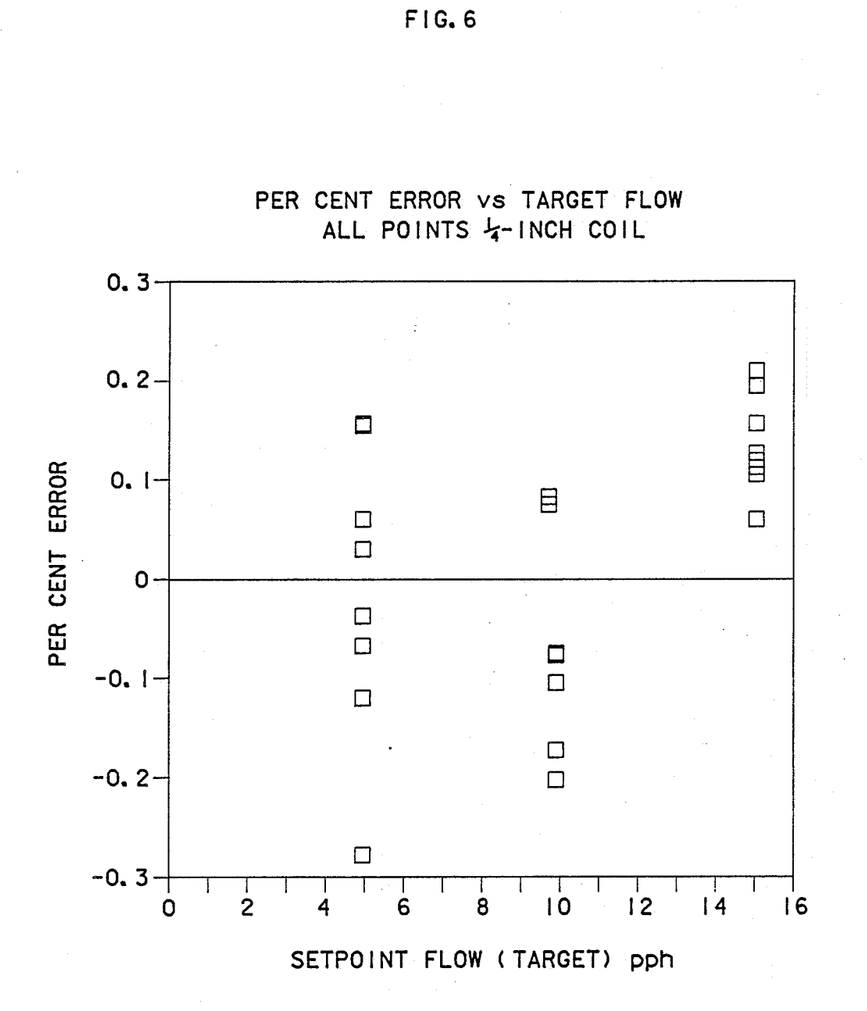
FIG. 6 is a chart showing the error spread of flow against target flow setpoints.

FIG. 6 shows the measured error in terms of percent of actual flow at 5, 10, and 15 pph. The error falls within 0.3 percent bounds. The bias in the data has been determined by previous work to be a function of the Electronic Controller. If the normal practice of percent of full scale were followed, the error would be less than 0.1 percent as the original meter was designed for 20 pph.

The accuracy during the fill cycle is explained by reference to FIG. 3 and the following description.

The lengths $l_3$, $l_4$ and $l_5$ can be made minimum by careful use of geometry. For example, the liquid reserve in the lower portion of the column can be made minimum (i.e., the span can be made greater), thus $l_3$ could approach 10 inches of water. $l_4$ and $l_5$ can be made identically equal to zero by placing the differential pressure transmitter even with the bottom of the column.

The pressure excursions can be minimized by:
(1) increasing $l_1$ and $l_0$, or
(2) using a volume tank and applying the Universal Gas Law and using the underlying assumption that very little gas is absorbed into the liquid $$P_E V_E = P_S V_S$$

$$P_S - P_E = \Delta P$$

where
$P_E$ = ending pressure with maximum volume $V_E$
$P_S$ = starting pressure with minimum volume $V_S$ $$\Delta P = P_E V_E / V_S - P_E$$

$$\Delta P = P_E \left( \frac{V_E}{V_S} \right) - 1$$

In the case of the actual embodiment $$V_E = l_0 A_0 + l_1 A_1 + l_2 A_2$$
$$V_S = l_0 A_0 + l_1 A_1$$

$$\therefore \Delta P = P_E \left[ \frac{l_0 A_0 + l_1 A_1 + l_2 A_1}{l_0 A_0 + l_1 A_1} - 1 \right]$$

$$= P_E \left[ \frac{l_2 A_1}{l_0 A_0 + l_1 A_1} \right]$$

Since $l_0 A_0 << l_1 A_1$ $$\therefore \Delta P = P_E \left[ \frac{l_2 A_1}{l_1 A_1} \right] = P_E [l_2/l_1]$$

$$l_1 = P_E l_2 / \Delta P$$
$\therefore$ for minimum $\Delta P$, $l_1$ must be made large.

This could make the column too tall. In that case, an additional volume bottle can be added to the side of the column.

$$\Delta P = P_E \left( \frac{V_E}{V_S} - 1 \right)$$

since $V_E = l_0 A_0 + l_1 A_1 + l_2 A_1 + V_T$
where $V_T$ = volume of tank
$V_S = l_0 A_0 + l_1 A_1 + V_T$ $$\Delta P = P_E \left( \frac{l_2 A_1}{l_0 A_0 + l_1 A_1 + V_T} \right)$$

again $l_0 A_0 << l_1 A_1 + V_T$ $$= P_E \left( \frac{l_2 A_1}{l_1 A_1 + V_T} \right)$$

now design the system so that
$l_1 A_1 << V_T$ $$\Delta P = P_E \left( \frac{l_2 A_1}{V_T} \right)$$

$$\therefore V_T = \frac{P_E l_2 A_1}{\Delta P}$$

If $\Delta P = 1$ psi
then $V_T = P_E l_2 A_1$

W can theoretically be eliminated by using a "filled leg differential pressure transmitter". This is well known in the art, but a practical device is not available. The currently available filled leg devices have at least a 0.5% meter error.

Likewise, the effects of pressure can be substantially reduced by the simple expedient of utilizing very tall calibration tanks and spanning only a small percentage of the tank. Since the Honeywell pressure transducer is effective over 25 inches of water, the span selected can be 40 or 50 inches pressure (based on water), such span constituting only a small percentage of total tank height (10 or 15 percent). Where extremely tall columns are not practical, the same benefits can be realized by using a side tank in open, gas-tight connection to the calibration tank headspace above the upper liquid level. The side tank can be concurrently sized and placed, and can be extremely remote from the calibration tank. While these embodiments are not critical, they can be conveniently applied to any non-venting apparatus of the present invention.

While certain embodiments and details have been shown for the purpose of illustrating the present invention, it will be apparent to those skilled in this art that various changes and modifications may be made herein without departing from the spirit or scope of the invention.

We claim:
1. A non-venting mass flowmeter apparatus comprising:
   (1) a substantially vertical container having a known mass content per unit of height or weight, said container in direct open fluid communication with conduits capable of carrying liquids;
   (2) means capable of providing a set minimum positive displacement pressure in said vertical container;
   (3) means for filling said vertical container against said set minimum pressure; and
   (4) means for monitoring the amount of liquid in said container as change in mass over a measured time interval.

2. An apparatus as described in claim 1 wherein the substantially vertical container is of substantially uniform cross-sectional area.

3. An apparatus as described in claim 2 wherein the means for monitoring the amount of liquid in the vertical column is a pressure head measurement.

4. A true non-venting mass flow apparatus comprising:

(1) a substantially vertical container having a known mass content per unit of height or weight, said container in direct open communication with at least one conduit capable of carrying liquids;
(2) means for providing a set minimum positive displacement pressure in said container;
(3) means for filling said vertical container against said set minimum pressure;
(4) means for monitoring the mass of a stream entering said container by measuring the change in pressure or weight within the container;
(5) means for monitoring the amount of liquid in said vertical container over a measured time interval and determining the rate of flow as change in mass divided by elapsed time as liquid exits the container;
(6) means for determining the ratio $$\frac{\text{mass exiting the container}}{\text{integrated output of previous flowmeter readings}}$$

to obtain a correction factor; and
(7) means for adjusting the flow rate of liquid in said flow line to a target flow rate based upon the correction factor.

* * * * *